(12) United States Patent
Toma

(10) Patent No.: US 7,811,343 B2
(45) Date of Patent: Oct. 12, 2010

(54) METHOD AND APPARATUS FOR SEPARATING LIQUID DROPLETS FROM A GAS STREAM

(75) Inventor: Peter Toma, Edmonton (CA)

(73) Assignee: Alberta Research Council, Inc., Edmonton (CA)

( * ) Notice: Subject to any disclaimer, the term of this patent is extended or adjusted under 35 U.S.C. 154(b) by 767 days.

(21) Appl. No.: 10/585,774

(22) PCT Filed: Jan. 26, 2005

(86) PCT No.: PCT/CA2005/000089

§ 371 (c)(1),
(2), (4) Date: Apr. 13, 2007

(87) PCT Pub. No.: WO2005/070520

PCT Pub. Date: Aug. 4, 2005

(65) Prior Publication Data

US 2008/0190853 A1     Aug. 14, 2008

(30) Foreign Application Priority Data

Jan. 27, 2004   (CA) .................................... 2456375

(51) Int. Cl.
B01D 45/06   (2006.01)
(52) U.S. Cl. ................. 55/318; 55/418.1; 55/419; 55/423; 55/434.2; 55/441; 55/445; 95/272
(58) Field of Classification Search ............... 55/315, 55/318, 418.1, 419, 423–426, 434, 434.2, 55/434.3, 434.4, 437, 438, 440–445, 447, 55/455, 462–465; 95/272
See application file for complete search history.

(56) References Cited

U.S. PATENT DOCUMENTS 1,928,706 A * 10/1933 Sillers ......................... 55/326

(Continued)

FOREIGN PATENT DOCUMENTS

CA     1047947     2/1979

(Continued)

OTHER PUBLICATIONS

Weingarten, J.S. et. al.; Development and Testing of a Compact Liquid-Gas Auger Partial Separator for Downhole or Surface Applications; Feb. 1997; SPE Production & Facilities; pp. 34-40. (Applicant submitted NPL doc on Aug. 8, 2008).*

(Continued)

Primary Examiner—Duane Smith
Assistant Examiner—Sonji Turner
(74) Attorney, Agent, or Firm—Terrence N. Kuharchuk; Rodman & Rodman

(57) ABSTRACT

A method and apparatus for separating liquid droplets from a gas stream. The method includes the steps of conditioning the gas stream which contains the droplets so that the gas stream exhibits substantially turbulent flow, passing the gas stream generally axially through a flowpath so that the gas stream is in communication with a collector surface, collecting the droplets on the collector surface, and draining the collector surface to remove the collected droplets from the collector surface. The apparatus includes a flowpath, a collector surface for collecting the droplets, a flow conditioner for conditioning the gas stream, and a drainage mechanism for draining the collected droplets from the collector surface.

31 Claims, 3 Drawing Sheets

U.S. PATENT DOCUMENTS

| | | | | |
|---|---|---|---|---|
| 2,349,944 | A * | 5/1944 | Dixon | 95/272 |
| 2,437,446 | A | 3/1948 | Stephens | |
| 2,659,450 | A | 11/1953 | Baird | |
| 2,921,647 | A * | 1/1960 | Pietrasz | 55/426 |
| 3,240,001 | A * | 3/1966 | Kuhn et al. | 55/392 |
| 3,289,398 | A * | 12/1966 | McIlvaine | 55/440 |
| 3,338,035 | A * | 8/1967 | Dinkelacker | 55/440 |
| 3,405,511 | A * | 10/1968 | Halter et al. | 55/440 |
| 3,413,778 | A * | 12/1968 | Lavery et al. | 96/190 |
| 3,517,486 | A * | 6/1970 | Golden | 55/440 |
| 3,616,623 | A * | 11/1971 | Reid | 55/440 |
| 3,850,599 | A * | 11/1974 | Calkin et al. | 55/440 |
| 3,870,488 | A * | 3/1975 | Arndt et al. | 55/440 |
| 3,872,014 | A | 3/1975 | Schell | |
| 3,884,660 | A | 5/1975 | Perry, Jr. et. al. | |
| 3,961,922 | A * | 6/1976 | Leung | 55/440 |
| 4,072,478 | A * | 2/1978 | Regehr et al. | 55/440 |
| 4,083,780 | A | 4/1978 | Call | |
| 4,187,089 | A | 2/1980 | Hodgson | |
| 4,240,814 | A * | 12/1980 | Regehr et al. | 55/423 |
| 4,322,233 | A * | 3/1982 | Sisk | 55/426 |
| 4,334,897 | A * | 6/1982 | Brady et al. | 96/356 |
| 4,361,426 | A * | 11/1982 | Carter et al. | 96/299 |
| 4,530,707 | A * | 7/1985 | Ovard | 55/440 |
| 4,553,993 | A * | 11/1985 | Wigley | 55/440 |
| 4,650,581 | A | 3/1987 | Angles et al. | |
| 4,769,050 | A | 9/1988 | Shaw et al. | |
| 4,802,901 | A * | 2/1989 | Wurz et al. | 55/440 |
| 4,919,696 | A * | 4/1990 | Higashi et al. | 55/434.4 |
| 4,975,101 | A * | 12/1990 | Swanborn | 55/440 |
| 5,137,637 | A | 8/1992 | Korin | |
| 5,391,211 | A | 2/1995 | Alliston et al. | |
| 5,393,315 | A | 2/1995 | Alliston et al. | |
| 5,869,771 | A | 2/1999 | Rajan et al. | |
| 5,972,062 | A * | 10/1999 | Zimmermann | 55/440 |
| 6,068,674 | A * | 5/2000 | Dullien et al. | 55/308 |
| 6,080,225 | A * | 6/2000 | Forster | 95/57 |
| 6,083,291 | A | 7/2000 | Okada et al. | |
| 6,083,302 | A * | 7/2000 | Bauver et al. | 95/216 |
| 6,149,697 | A * | 11/2000 | Dullien et al. | 55/308 |
| 6,514,322 | B2 | 2/2003 | West | |
| 6,524,373 | B2 | 2/2003 | Afeiche et al. | |
| 6,770,121 | B1 * | 8/2004 | Sindel | 95/267 |
| 6,810,835 | B2 | 11/2004 | Ishiguro et al. | |
| 7,270,690 | B1 * | 9/2007 | Sindel | 55/320 |
| 7,314,495 | B2 * | 1/2008 | Dullien et al. | 55/308 |
| 7,550,032 | B2 * | 6/2009 | Brouwers et al. | 95/141 |

FOREIGN PATENT DOCUMENTS

| | | |
|---|---|---|
| CA | 1113024 | 11/1981 |
| CA | 2127773 | 7/1995 |
| CA | 2 298418 | 8/2001 |
| CA | 2448255 | 12/2002 |
| CA | 2477456 | 11/2003 |
| CA | 2388108 | 12/2003 |
| GB | 1505293 | 3/1978 |
| NL | 1002543 | 9/1997 |
| WO | WO 87/07185 | 12/1987 |
| WO | WO 99/38602 | 8/1999 |
| WO | WO 01/58575 | 8/2001 |

OTHER PUBLICATIONS

Kouba, G.E. And Shoham, O., "A Review of Gas-Liquid Cylindrical Cyclone (GLCC) Technology," presented at the "Production Separation Systems" International Conference, Aberdeen, U.K., Apr. 23 & 24, 1996, 25 pp.

Wang, Shouba et. al., "Gas-Liquid Cylindrical Cyclone (GLCC) Compact Separators for Wet Gas Applications," Proceedings of ETCE 2001, Engineering Technology Conference on Energy, Feb. 5-7, 2001, Houston, TX, 11 pp.

International Search Report dated Apr. 6, 2005 and International Preliminary Report on Patentability dated Jul. 27, 2006 from the ISA in corresponding PCT International Application PCT/CA2005/000089.

Materials downloaded Mar. 31, 2003 from the Tulsa University Separation Technology Projects website www.tustp.org/about_the_glcc, 12 pp.

Wang, Shoubo et. al., presentation entitled "High Pressure Testing of Wet Gas GLCC Separators", University of Tulsa, Feb. 5, 2002, 17 pp.

"New Design for Compact Liquid-Gas Partial Separation: Downhole and Surface Installations for Artifical Lift Applications"; J.S. Weingarten et al; SPE Paper 30637; 1995.

"Hydrodynamics of Two-Phase Flow in Gas-Liquid Cylindrical Cyclone Separators"; I. Arpandi et al; SPE Paper 30683; 1995.

Weingarten, J.S. et al "Development and Testing of a Compact Liquid-Gas Auger Partial Separator for Downhole or Surface Applications"; SPE Production and Facilities, pp. 34-40, Feb. 1997.

Arpandi et al; "Hydrodynamics of Two-Phase Flow in Gas-Liquid Cylindrical Cyclone Separators", SPE Paper 30683; 1995.

* cited by examiner

METHOD AND APPARATUS FOR SEPARATING LIQUID DROPLETS FROM A GAS STREAM

FIELD OF THE INVENTION

A method and apparatus for separating liquid droplets from a gas stream.

BACKGROUND OF THE INVENTION

Separation of very fine liquid droplets from a gas is required in many applications where finely dispersed liquid droplets are used in chemical or energy processes.

One example involves the fine pulverization of water prior to admission into the suction side of a compressor, aiming at increasing the effectiveness of a (turbo) compressor by cooling the gas before admission. Even if it is assumed that cooling-evaporation consumes 70-80% of the liquid dispersed into atomized droplets, approximately 20% of the liquid in the form of fine droplets remain and enter the combustion chamber (of the gas turbine power equipment). Due to the resulting "humid" nature of the combustion gas, the system efficiency, while considerably increased by cooling the air prior to compression, may be reduced by 2% or more. In the case of a 10 MW gas turbine unit such a reduction in efficiency represents a significant amount of energy (which is consumed as latent heat for evaporation in the combustion chamber).

In a second example, a fine pulverization is required to increase the contact area of a liquid reactant in order to improve the contact area in a chemical reaction (e.g., 1 liter=1 dm$^3$ of liquid pulverized to a 5 μm droplet size will acquire an exchange area of approximately 4800 m$^2$).

In a third example, aiming at the removal of extremely fine solid particles, a particle cloud is "chased" by pulverized liquid droplets which are formed by a pulverization process. A correlation is required between the size distribution of the solid particles and the size distribution of the liquid droplets (which "chase" and coalesce with the "dust-like" solid particles) in the range of "a similar order of magnitude" (e.g. micron for micron).

In a fourth example a gas may be selectively separated using a non-contact (surface) gas extraction device. Atomization of a fine cloud of a selective adsorbent/absorbent in the form of a dense cloud of micro-droplets will represent a solution which will avoid the need for film or solid support surfaces.

In a fifth example, liquid micro-droplets may result from a process of bulk condensation, where a humid gas (containing water or any other solvent in a gaseous form) is exposed to a pressure-temperature process and with the aid of a large population of sub-"micronic"impurities (usually present in any industrial gas) offers conditions for "bulk condensation" of the liquid micro-droplets.

In a sixth example, a number of technologies can be grouped together in the field of "direct contact heat & mass exchangers" which may be used to avoid the use of conventional bulky equipment, fouling, corrosion, large capital & operation costs and to take full advantage of existing or created micro-droplets of liquid for contacting gas or solids (in fine particulate form) and/or for the enhancement of chemical reactions, evaporation processes, heat transfer processes and mass transfer processes.

Although the technology of atomizing or pulverizing liquids into droplets is well represented in the technical literature (see for example "Atomization & Sprays", A. H. Lefebre, printed by Taylor & Francis-Hemisphere, 1989), the next important stage of almost any such modern processing system, consisting of the effective separation of the "processed"or created micro-droplet population (usually suspended by a gas), is not well developed, is difficult and represents the main deterrent for a broader application of direct-contact technologies (micro-droplets of liquid direct contacting gas and/or dust-like micro-particles).

In any separation technology a proper balance between separation efficiency, maintenance cost and minimization of pressure drop, whether in a clean or clogged state, is essential. Some exemplary separation technologies disclosed in the art include the following:

(a) particles to be separated are electrically charged prior to entering the separator apparatus and meet walls carrying an opposite electrical charge (electrostatic or AC/DC). Aqueous droplets are generally avoided due to high-electrical conductance and other electrically related safety concerns, with the result that electrically based separation technologies typically cannot be used for separating aqueous or highly electrically conductive liquids. These technologies do, however, provide a "wall extraction" but in a laminar, quiescent flow regime, which detracts from the system efficiency but enhances the particle removal mechanism;

(b) filters and coalescers, metallic and non-metallic pads and micro-porous filled containers for liquid droplets and solid particles may represent viable alternatives for some applications. These technologies can be used in tailored applications but require frequent maintenance, particularly where impurities are attached to any of the phases of the fluid system being treated. Clogging is one of the more important problems associated with these types of separation technologies. Where "plugging" impurities are attached to one or more phases of the fluid system being treated, and where large amounts of gas throughput should be processed with minimum pressure drop, the use of micro-porous container or pads system is typically excluded, thus eliminating the application of these types of technologies from fluid systems carrying "gum-like" suspensions (as in oil/gas fields), which have the tendency to rapidly deteriorate the flow-pressure drop characteristics of the fluid flow and render the technology inefficient or unacceptable;

(c) mechanical separation technologies may be used to separate liquid droplets from some fluid systems, but the separation of liquid micro-droplets entrained by a gas is known to pose practical problems with most conventional mechanical separator designs including gravitational separators which depend upon gravity settling and according to Stokes' Law require a residence time (Liquid Volume ($m^3$)/Throughput in ($m^3$/h)) in excess of the time required for a liquid particle to reach the liquid-gas interface. For example, for a liquid micro-droplet having a size of 5 μm (1 μm=1 m/$10^6$), a free falling velocity in air is obtained (from Stokes' Law) according to Equation 1:

$$U_{droplet} = \frac{d_p^2(\rho_{liq} - \rho_{air})}{18\eta} g = \frac{(5/10^6 \text{m})^2 (1000 - 1)(\text{kg/m}^3)}{18[(0.02cP)/1000](\text{kg/ms})} 9.81(\text{m/s}^2) \approx 0.06/100(\text{m/s}) = 0.6\text{mm/s} \quad (1)$$

where $U_{droplet}$ is the free falling velocity, dp is the spherical diameter of droplet/particle (falling under Stokes'

Law), μ is the viscosity in SI units (1 cP=1/1000 kg/m s), and ρ is the densities of water (for the water droplets) and gas.

For a gas space of 0.5 m, a 5 μm droplet will require approximately 1000 s (16 minutes) to reach the liquid level, for a 2 μm micro-droplet, the required time (in absolutely still air) is more than 30 min.

Conventional (gravity/cyclone) separation are customarily designed for a "free gas" velocity of approximately 0.1-0.3 m/s. At this order of velocity magnitude, all droplets having a free falling velocity an order of magnitude smaller will typically be entrained and will not fall and separate. Therefore, any technology using a "gravity separation mechanism" is not typically feasible for the separation of liquid micro-droplets from gas streams.

(d) cyclone, rotational, and other inertial separation technologies may also be used to separate liquid droplets in some applications. In these technologies, the effect of separation may be intensified using a "cyclone" or other inertial effect. This may be visualized if, in Equation (1) the acceleration due to gravity ($g=9.81\ m/s^2$) is replaced by centrifugal acceleration $R\omega^2$ ($m/s^2$). Measured as a "multiple of "g", centrifugal acceleration is practically limited to about 5-10 times "g" (or a maximum of 40 g for extremely expensive separation units and about 100 g for special "multiple plate designs"). Even if a "10 g" separation apparatus is utilized, the centrifugal acceleration achieved may not be high enough for effective separation of micro-particles.

A self-generated (swirl flow) cyclone will typically achieve relatively low "g" values unless extremely high pressure drops are acceptable in the system.

Another solution would be to create a "compact" unit where the "free falling distance to interface" is significantly reduced (to be in the order of about 1 centimeter) in order to reduce the required residence time for separation. This approach is used for some special (heavy oil) liquid-liquid-solid separators, where the viscosity of the continuous phase (i.e., the carrier) is a deterrent to the use of other technologies.

SUMMARY OF THE INVENTION

The present invention includes a method and apparatus for separating liquid droplets from a gas stream. The liquid droplets may be comprised solely of liquid or the liquid droplets may contain solid particles and/or entrained gas.

The liquid droplets may be comprised of any liquid or combination of liquids, the solid particles contained in the liquid droplets (where present) may be comprised of any solid or combination of solids, the entrained gas contained in the liquid droplets (where present) may be comprised of any gas or combination of gases, and the gas stream may be comprised of any gas or combination of gases.

Preferably, the invention is used generally for removing impurities from the gas stream, where "impurities" may include any unwanted liquid or solid. The removal of such impurities may be desirable in order to protect equipment which is to be exposed to the gas stream from fouling or malfunctioning as a result of the presence of the impurities, or to increase the efficiency of such equipment.

In preferred embodiments, the invention is intended for use in removing liquid droplets substantially comprising water (with or without solid particles) from a gas stream which may for example be comprised of air or hydrocarbon gas. In a particular preferred embodiment, the invention is intended for use in removing liquid droplets such as water droplets from natural gas fuels in order to protect burner systems in cold climates from clogging and malfunctioning due to the formation of ice deposits.

The invention may in principle be used to remove liquid droplets of any size from a gas stream, but is considered to be most beneficial for use in separating droplets having a size within a range of sizes of between about 1 μm and about 100 μm, between about 1 μm and about 50 μm or even between about 1 μm and about 20 μm, since droplets within these size ranges are typically very difficult to separate using either gravity or inertial separation technologies.

As a result, allowing for droplet size distributions within a gas stream, preferably at least fifty percent by weight of the liquid droplets have a size within the size ranges identified above.

Embodiments of the invention are based upon some or all of the following principles:

(a) liquid droplets entrained in a gas stream will be attracted by interfacial tension or adhesion forces to a collector surface such as a collector wall;

(b) the likelihood or probability of liquid droplets moving close enough to the collector surface for the adhesion forces to collect the droplets on the collector surface as collected droplets can be significantly enhanced by exposing the gas stream to the collector surface under substantially turbulent flow conditions, such that the droplets are directed to randomly contact (or nearly contact) the collector surface; and (c) coalescing of the collected droplets on the collector surface can produce a population of coalesced collected droplets which can subsequently be separated from a gas phase using gravitational or inertial separation technologies.

In a first apparatus aspect, the invention is an apparatus for separating liquid droplets from a gas stream, comprising:

(a) a collector surface for collecting the droplets as collected droplets; and (b) a drainage mechanism associated with the collector surface for removing the collected droplets from the collector surface.

In a second apparatus aspect, the invention is an apparatus for removing liquid droplets from a gas stream, the apparatus comprising:

(a) a flowpath for the gas stream, the flowpath comprising a flowpath inlet;

(b) a collector surface, positioned adjacent to the flowpath so that the gas stream is in communication with the collector surface as the gas stream passes through the flowpath, for collecting the droplets as collected droplets;

(c) a flow conditioner in communication with the flowpath inlet, for conditioning the gas stream to provide substantially turbulent and generally axial flow of the gas stream through the flowpath; and (d) a drainage mechanism associated with the collector surface, for draining the collected droplets from the collector surface.

In a third apparatus aspect, the invention is an apparatus for removing liquid droplets from a gas stream, the apparatus comprising:

(a) a plurality of parallel flowpath assemblies, each of the flowpath assemblies comprising:

(i) a flowpath for the gas stream, the flowpath comprising a flowpath inlet;

(ii) a collector surface, positioned adjacent to the flowpath so that the gas stream is in communication with the collector surface as the gas stream passes through the flowpath, for collecting the droplets as collected droplets;

(iii) a flow conditioner in communication with the flowpath inlet, for conditioning the gas stream to provide substantially turbulent and generally axial flow of the gas stream through the flowpath;

(iv) a drainage mechanism associated with the collector surface, for draining the collected droplets from the collector surface; and (b) a distributor associated with the flowpath inlets, for distributing the gas stream to the flowpaths.

In a first method aspect, the invention is a process for separating liquid droplets from a gas stream, comprising:

(a) providing a collector surface;

(b) exposing the gas stream to the collector surface under substantially turbulent flow conditions in order to cause the droplets to accumulate on the collector surface as collected droplets; and (c) removing the collected droplets from the collector surface.

In a second method aspect, the invention is a method of removing liquid droplets from a gas stream, comprising:

(a) conditioning the gas stream so that the gas stream exhibits substantially turbulent flow;

(b) passing the gas stream generally axially through a flowpath under substantially turbulent flow conditions so that the gas stream is in communication with a collector surface positioned adjacent to the flowpath, thereby causing the droplets to collect on the collector surface as collected droplets; and (c) draining the collector surface to remove the collected droplets from the collector surface.

The collected droplets are preferably permitted or encouraged to coalesce on the collector surface before the collected droplets are drained from the collector surface, so that the collected droplets form small pools, liquid films or rivulets of coalesced collected droplets on the collector surface. Such coalesced collected droplets are relatively easy to drain from the collector surface and may themselves function to attract and collect additional droplets or solid particles on the collector surface. In addition, such coalesced collected droplets, once drained from the collector surface, are relatively more easy to separate from a gas phase using gravitational or inertial separation technologies than are the liquid droplets before they are collected and coalesced.

An important feature of the invention is that substantially turbulent flow in the gas stream in the vicinity of the collector surface is provided. In other words, the flow of the gas stream through the flowpath should at least exhibit a Reynolds number which exceeds the minimum Reynolds number for transition from laminar flow to turbulent flow so that the flow can be considered to be either transitional or fully turbulent. More preferably, the flow of the gas stream through the flowpath should exhibit a Reynolds number which is near to or exceeds the minimum Reynolds number for fully turbulent flow so that the flow can be considered to be fully turbulent.

As a result, the term "turbulent flow" as used herein is intended to encompass flow which may be considered to be either transitional or fully turbulent, but which preferably is fully turbulent. The term "substantially turbulent flow" as used herein is intended to encompass turbulent flow in which minor or insubstantial portions of the gas stream may not experience turbulent flow at a particular time or location.

The scale dimension "L" and superficial gas velocity "U" should therefore most preferably be designed so that the Reynolds number (Re) equals or exceeds the critical Reynolds number ($Re_{cr}$) for fully turbulent flow with a particular configuration of flowpath and collector surface, so that $Re \geq Re_{cr}$ where:

$$Re = \frac{U(m/s) \times L(\text{geometry factor} - m)}{\nu(m^2/s)} (-) \quad (2)$$

where U is the average gas stream velocity in m/s, L is a geometry factor (for pipes L=inside diameter (m)), and $\nu$ is the gas kinematic viscosity in ($m^2/s$). As an example, for a gas absolute viscosity of 0.02 cP and a density of 1.2 kg/m$^3$, the gas kinematic viscosity is: $\nu$ (m$^2$/s)=0.02 cP/(1.2 kg/m$^3$/1000)=16.6 (m$^2$/s).

A preferred goal of the invention is to minimize re-atomization and re-entrainment back into the gas stream of collected droplets which have collected and coalesced on the collector surface (resulting from the collection of the droplets on the collector surface and subsequent coalescence of the collected droplets). An alternate preferred goal of the invention is to provide that if droplets do become re-atomized or re-entrained in the gas stream, the re-entrained or re-atomized droplets have a size which is significantly larger than the size of the liquid droplets which were contained in the gas stream before they were collected on the collector surface. Preferably the re-atomized or re-entrained droplets have an average size which is at least ten times the average size of the original liquid droplets.

It has been found that these goals can be achieved by controlling one or more flow parameters relating to the flow of the gas stream through the flowpath. Such flow parameters may relate to a maximum Weber number within the flowpath, to the maintenance of annular flow conditions within the flowpath, to the superficial gas velocity of the gas stream through the flowpath, or to some other parameter.

As a first example, it has been found that by limiting the Weber number pertaining to the flow of the gas stream through the flowpath to a Weber number which does not exceed the "film breaking threshold" for the collected droplets, re-entrainment and re-atomization of collected droplets can be minimized. In particular, it has been found that a suitable limit on the value of the Weber number for collected droplets comprising water is about 30, such that:

$$We = \frac{\rho_G U_G^2 d}{\sigma}(-) \leq 30 \tag{3}$$

where We is Weber number, $\rho_G$ is the density of the gas phase of the gas stream, $U_G$ is the superficial gas velocity of the gas stream, d is the diameter of the droplet and $\sigma$ is the interfacial tension of the liquid comprising the droplet.

As a second example, it has been found that by limiting the superficial velocity of the gas stream through the flowpath to a velocity which is less than a "critical atomization gas velocity" of the gas stream through the flowpath, the extent of re-atomization and re-entrainment of the droplets back into the gas stream can be minimized.

The "critical atomization gas velocity" may be estimated, using an assumed annular flow pattern through the flowpath, as the velocity at which a typical droplet formed through breaking and atomization of a liquid film of coalesced collected droplets at the liquid-gas interface in an annular flow pattern will remain in suspension in the gas stream, according, for example, to the following equations:

$$\frac{C_d \frac{\pi d^2}{4} \rho_G U_G^2}{2} = \frac{\pi d^3}{6} g \Delta \rho \quad (4)$$

where $C_d$ is the friction coefficient of the droplet, d is the diameter of the droplet, $\rho_G$ is the density of the gas phase of the gas stream, $U_G$ is the superficial gas velocity of the gas stream, g is acceleration due to gravity, and $\Delta \rho$ is the difference in densities between the liquid comprising the droplet and the gas phase of the gas stream.

$$U_G = \left[\frac{4g\Delta\rho d}{3\rho_G C_d}\right]^{1/2} \quad (5)$$

where $U_G$ is the superficial gas velocity of the gas stream, g is acceleration due to gravity, $\Delta \rho$ is the difference in densities between the liquid comprising the droplet and the gas phase of the gas stream, $\rho_G$ is the density of the gas phase of the gas stream, and $C_d$ is the friction coefficient of the droplet.

$$We = \frac{\rho_G U_G^2 d}{\sigma}(-) \quad (6)$$

where We is Weber number, $\rho_G$ is the density of the gas phase of the gas stream, $U_G$ is the superficial gas velocity of the gas stream, d is the diameter of the droplet and σ is the interfacial tension of the liquid comprising the droplet.

The size of the typical droplet can be estimated by assuming a critical Weber number for atomization (for example We=30) and by assuming a typical drag coefficient for gas at a high Reynolds number (for example $C_d$=0.44), so that by combining Equation (5) and Equation (6), the following equation is obtained:

$$U^S_{Gmin\Rightarrow A} = 3.1\frac{(\sigma g\Delta\rho)^{1/4}}{\rho_G^{1/2}}(\text{m/s}) \tag{7}$$

where $U^S_{Gmin\rightarrow A}$ is the critical atomization gas velocity.

As an example, for a water-air system at a standard temperature of about 15 degrees Celsius and a standard pressure of about 1 atmosphere, the critical atomization gas velocity is about 14.5 meters per second.

At velocities less than the critical atomization gas velocity, droplets may break from the liquid film and atomize into the gas stream, but will tend to re-collect on the collector surface (which for the numerical example above is considered to be a liquid film comprising coalesced collected droplets, which liquid film has formed on the collector surface).

At velocities at or slightly greater than the critical atomization gas velocity, droplets may become re-atomized or re-entrained in the gas stream, but their size will tend to be significantly larger than the size of the liquid droplets which were originally contained in the gas stream, thus making the re-atomized and re-entrained droplets relatively more easy to separate from the gas stream using gravitational or inertial separation technologies.

The use of a moderate but effective substantially turbulent flow in the vicinity of the collector surface in the manner as described above facilitates the separation of the droplets from the gas stream at a relatively small pressure drop while preferably maintaining the overall separation efficiency at desirable levels (for example, above about 90%).

The collector surface may be comprised of any surface or combination of surfaces which is suitable for collecting the droplets. For example, the collector surface may be generally planar, may be generally cylindrical or tubular, may be generally rectangular, or may be any other shape or configuration. The collector surface may be constructed of metal, non-metal or composite materials. The collector surface may be rigid or flexible and may be stationary or moving. In some embodiments, the collector surface may be comprised of a liquid surface, which liquid surface may be supported by a solid surface. The liquid surface may be comprised of a liquid having the same composition as the droplets to be collected, or the liquid surface may be comprised of a liquid having a different composition from the droplets to be collected.

The collector surface may be relatively smooth or textured. Preferably the collector surface is textured. The collector surface may be textured in any manner, such as by being relatively rough, corrugated, ribbed or wavy, in order to promote turbulent flow of the gas stream past the collector surface and/or to enhance the collection of the droplets on the collector surface. The collector surface may also be comprised of one or more grooves, channels or depressions for collecting the droplets which approach the collector surface.

The collector surface preferably is "wettable" by the droplets which are intended to be collected by the collector surface so that the formation of a film of coalesced collected droplets on the collector surface and movement of the film along the collector surface will be promoted. In other words, preferably a significant adhesion force will be exhibited between the collector surface and the droplets.

The collector surface may be constructed entirely of a wettable material or the collector surface may be lined or coated with a wettable material. The wettable material is preferably comprised of a solid but may be comprised of a liquid. For example, the collector surface may be comprised of a solid surface which is lined or coated with a liquid material. The liquid material may be comprised of a liquid having the same composition as the droplets to be collected, or the liquid material may be comprised of a liquid having a different composition from the droplets to be collected.

The selection of a suitable wettable material will depend upon the droplets which are intended to be collected by the collector surface. For example, in some applications, it may be desirable for the collector surface to be "water-wettable" while in other applications, it may be desirable for the collector surface to be "oil-wettable".

The flowpath may be comprised of any pathway for the gas stream which will permit communication between the gas stream and the collector surface as the gas stream passes through the flowpath. The flowpath may be surrounded by the collector surface so that the flowpath is defined by the collector surface. Alternatively, the collector surface may be positioned within the flowpath or positioned adjacent to the flowpath.

In one preferred embodiment, the flowpath is defined by the collector surface, which collector surface is comprised of a plurality of generally planar surfaces which together form a generally rectangular conduit for the gas stream. In this embodiment, further collector surface area may be provided by inserting within the rectangular conduit one or more additional surfaces such as planar surfaces.

In a second preferred embodiment, the flowpath is defined by the collector surface, which collector surface is comprised of a generally cylindrical surface such as a pipe which forms a conduit for the gas stream. In this embodiment, further collector surface area may be provided by inserting within the pipe one or more suitable projecting surfaces.

The flowpath comprises a flowpath inlet. The flowpath may further comprise a flowpath outlet so that the gas stream passes through the flowpath from the flowpath inlet to the flowpath outlet and exits or drains from the flowpath via the flowpath outlet.

Preferably, however, the flowpath is comprised of a flowpath inlet and a flowpath end so that the gas stream passes through the flowpath between the flowpath inlet and the flowpath end, but does not exit or drain from the flowpath via the flowpath end. Instead, the gas stream passes through the flowpath and exits the flowpath via a gas drainage mechanism positioned between the flowpath inlet and the flowpath end.

In some embodiments, the gas stream may drain from the flowpath from both a flowpath outlet and from a gas drainage mechanism.

The gas drainage mechanism and the drainage mechanism for the collected droplets may be comprised of separate drainage mechanisms or may be comprised of a single combined drainage mechanism for both the collected droplets and the gas stream. Preferably the gas drainage mechanism and the drainage mechanism for the collected particles are comprised of a single combined drainage mechanism.

The flowpath may be oriented in any direction relative to gravity. For example, the flowpath may be oriented so that it is generally horizontal, generally inclined or generally declined from the flowpath inlet. Preferably, the flowpath is oriented to be generally declined from the flowpath inlet such that the flowpath outlet or the flowpath end is positioned below the flowpath inlet, in order that the passage of the gas stream through the flowpath will tend to encourage the collected droplets to move downward relative to gravity, thus promoting coalescence of the collected droplets and enhancing subsequent drainage of the coalesced collected droplets.

In some embodiments, different portions of the flowpath may be oriented to be generally declined, generally inclined, and/or generally horizontal.

The flowpath may be comprised of any cross-sectional shape or cross-sectional area. Where the flowpath is generally cylindrical, the diameter of the flowpath is preferably between about 15 millimeters and about 50 millimeters. It has been found during modeling of the invention with respect to a generally cylindrical flowpath that the ability of the collector surface to collect droplets diminishes if the flowpath has a diameter smaller than about 15 millimeters or larger than about 50 millimeters. Where the flowpath is not generally cylindrical, the optimum size of the flowpath may be determined through testing or by modeling.

The flow conditioner may be comprised of any structure, device or apparatus which is capable of conditioning the gas stream to provide substantially turbulent and generally axial flow of the gas stream through the flowpath. Turbulent flow of the gas stream increases the probability that the droplets will contact the collector surface or be placed within suitable proximity to the collector surface so that the adhesion forces between the droplets and the collector surface will cause the droplets to become collected on the collector surface.

The generally axial flow of the gas stream distinguishes the invention from inertial separation technologies which utilize cyclonic flow to cause droplets to collect on a surface due to the effects of centrifugal acceleration.

Where the gas stream is not otherwise flowing, the flow conditioner may be further comprised of a structure, device or apparatus which is capable of imparting flow to the gas stream. In such circumstances, the flow conditioner may be comprised of a single structure, device or apparatus for performing both of these functions or may be comprised of a plurality of structures, devices or apparatus for performing these functions.

In some preferred embodiments, the flow conditioner is comprised of an admission chamber which has a conical shape for progressively increasing the gas velocity to a level which will provide substantially turbulent flow through the flowpath, having regard to pressure, pressure drop limitations, concentration of droplets in the gas stream, erosion control within the apparatus and other factors. In some preferred embodiments, the flow conditioner may be further comprised of a grid or screen for achieving pseudo-homogeneous turbulent flow conditions by reducing or eliminating large turbulent vortexes (i.e., macro-turbulence) resulting from ducts, elbows etc. upstream of the flow conditioner.

In other preferred embodiments the flow conditioner may be comprised of an orifice which will provide substantially turbulent flow through the flowpath.

Finally, in preferred embodiments, the flow conditioner may be further comprised of a pump, a fan or other structure, device or apparatus for imparting flow to the gas stream, in circumstances where the gas stream is not otherwise flowing.

The drainage mechanism may be comprised of any structure, device, apparatus or system for draining the collected droplets from the collector surface. For example, the drainage mechanism may be comprised of a vacuum system or a mechanical wiper system for removing the droplets from the collector surface.

Preferably the drainage mechanism is further comprised of the gas drainage mechanism for draining the gas stream from the flowpath.

Preferably the drainage mechanism is comprised of one or more apertures defined by the collector surface. More preferably the drainage mechanism is comprised of one or more slits defined by the collector surface. In preferred embodiments the drainage mechanism is comprised of a plurality of slits which are spaced axially along the collector surface between the flowpath inlet and the flowpath outlet. The slits preferably function both to drain the collected particles from the collector surface and to drain all or a portion of the gas stream from the flowpath.

The slits are preferably defined by the collector surface so that they are oriented transverse to the flowpath.

The slits are preferably sized and spaced along the flowpath to provide for an adequate slit area to drain effectively the collected droplets. In embodiments where all or a portion of the gas stream is to be drained from the flowpath via the slits, the slits are preferably sized and spaced to provide for an adequate slit area to drain effectively both the collected droplets and the gas stream. In such embodiments, the slits are also preferably sized and spaced to provide a relatively uniform and limited superficial gas velocity through each of the slits and to provide a relatively low pressure drop as the gas stream drains through the slits.

For example, the slits may be spaced and sized so that there is relatively more slit area toward the flowpath inlet and relatively less slit area toward the flowpath outlet or flowpath end. This result can be achieved by decreasing the frequency and/or size of the slits from the flowpath inlet toward the flowpath outlet or flowpath end. The slits may also be spaced and sized so that the total slit area is approximately equal to the cross-sectional area of the flowpath, so that the superficial gas velocity of the gas stream through the slits is slightly less than or approximately equal to the superficial gas velocity of the gas stream through the flowpath. Preferably the superficial gas velocity of the gas stream through the slits is slightly less than the superficial gas velocity of the gas stream through the flowpath.

The drainage mechanism may be further comprised of textures or shapes formed in the collector surface. For example, the collector surface may define troughs or grooves for collecting the droplets or coalescing the collected droplets and directing them toward the apertures for removal from the collector surface. Preferably the collector surface is configured so that the collected droplets are allowed to move along the collector surface toward the apertures under the influence of gravity. In preferred embodiments this result may be achieved by inclining or declining the flowpath.

The apparatus may be further comprised of a collection vessel associated with the drainage mechanism for receiving and/or storing the collected droplets or coalesced collected droplets which are drained from the collector surface. The collection vessel may also function to receive and/or store the gas stream which has been drained from the flowpath via the drainage mechanism.

Preferably the drainage mechanism communicates with a single collection vessel. Alternatively, a plurality of collection vessels may be provided. The collection vessel may be open or closed, but is preferably closed so that one or more gas phases can be received and stored in the collection vessel.

The collection vessel may function only to receive and/or store the drained collected droplets and the drained gas stream. Alternatively, the collection vessel may comprise a secondary separation vessel for separating constituents of the drained collected droplets and the drained gas stream into a plurality of products. The secondary separation occurring in the collection vessel may utilize gravitational or other separation techniques. The products obtained from the secondary separation may be disposed of, returned to the overall process, or recovered for other uses.

The collection vessel may be positioned at any location relative to the flowpath and the collector surface. For example, the collection vessel may be positioned so that it is remote from the flowpath and the collector surface and even in a separate building or installation therefrom. In some preferred embodiments, the collection vessel may substantially or completely surround the flowpath and the collector surface so that the flowpath and the collector surface are fully or partially contained within the collection vessel.

The apparatus may be further comprised of a cooler associated with the flowpath inlet for cooling the gas stream before it enters the flowpath. The cooler may be comprised of any structure, device or apparatus capable of removing heat from gases and vapors. Cooling of the gas stream may assist in increasing the efficiency of the apparatus by condensing vapor or by condensing liquid droplets contained in the gas stream to form larger droplets which are more easily separated. Where included, the cooler is positioned upstream of the flowpath inlet so that the gas stream can be cooled before it enters the flowpath. Preferably the cooler is positioned before or at the flow conditioner.

The apparatus may be further comprised of a washer for washing or rinsing the collector surface to remove solid residues or impurities which may interfere with the operation of the apparatus. The washer may be comprised of any structure, device or apparatus which is capable of removing such residues and/or impurities. Where provided, the washer is preferably operated intermittently during times when the gas stream is not being passed through the flowpath so that the operation of the washer does not interfere with the operation of the apparatus.

In preferred embodiments, the apparatus may be comprised of a plurality of flowpaths configured in parallel. The use of a plurality of flowpaths facilitates an increase in the throughput of the apparatus, potentially reduces the overall pressure drop through the apparatus, and may also serve to provide a greater surface area of collector surface for collection of droplets.

The plurality of flowpaths may be isolated from each other or communication between the plurality of flowpaths may be provided. For example, the plurality of flowpaths may be defined by one or more axially extending collector surfaces in the form of walls or dividers within a larger flowpath chamber, which walls or dividers may extend completely within the flowpath chamber to define isolated flowpaths or may extend only partially within the flowpath chamber as longitudinal baffles to define flowpaths which are in communication with each other.

Where the apparatus includes a plurality of flowpaths, the apparatus also includes a plurality of collector surfaces for collecting droplets from each of the flowpaths. Where the apparatus includes a plurality of flowpaths, the apparatus preferably also includes a distributor associated with the flowpath inlets for distributing the gas stream amongst the flowpaths.

The distributor may be comprised of any structure, device or apparatus which is effective to distribute the gas stream from a source of the gas stream to the plurality of flowpaths. Preferably the distributor distributes the gas stream substantially evenly or such that similar flow conditions are experienced in each of the flowpaths. The distributor may be combined with the flow conditioner in a single combined apparatus or the distributor may be separate from the flow conditioner.

In preferred embodiments, the distributor is comprised of a manifold which is associated with the flow conditioner such that a single structure, device or apparatus performs the conditioning function and the distributing function.

In some preferred embodiments, the flow conditioner and the distributor are together comprised of an admission chamber and/or grid of the type described for use as the flow conditioner, so that the admission chamber and/or grid communicate with each of the flowpaths.

In some preferred embodiments, the flow conditioner and the distributor are comprised of a distributor manifold comprising turbulence promoting orifices, which distributor manifold both distributes the gas stream amongst the flowpaths and adjusts the velocity of the portion of the gas stream which is delivered to each of the flowpaths.

The method of the invention may be performed using the apparatus of the invention or may be performed using a different apparatus or combination of apparatus. Preferably the method of the invention is performed using the apparatus of the invention. The method may be performed using a single flowpath or a plurality of flowpaths.

In the method of the invention, the gas stream conditioning step may be comprised of any procedure or combination of procedures which results in the gas stream exhibiting substantially turbulent and generally axial flow through the flowpath or flowpaths. In preferred embodiments, the gas stream conditioning step is performed using a flow conditioner of the type described for the apparatus of the invention.

In the method of the invention, the gas stream passing step may be comprised of any procedure or combination of procedures which results in the gas stream communicating with a collector surface positioned adjacent to the flowpath or flowpaths. In preferred embodiments, the gas stream passing step is performed by passing the gas stream through the flowpath or flowpaths from the flowpath inlets to the flowpath outlets.

The gas stream is preferably passed through the flowpath such that re-entrainment into the gas stream of the droplets which have collected on the collector surface is minimized. This result may be achieved by controlling the flow of the gas stream through the flowpath with reference to one or more flow parameters which are relevant to the propensity of the droplets to become re-entrained in the gas stream.

According to a first flow parameter, the superficial gas velocity of the gas stream through the flowpath may be maintained at a velocity which is less than the critical atomization gas velocity of the gas stream. According to a second flow parameter, the gas stream may be passed through the flowpath under conditions such that the Weber number is less than or equal to about 30 (assuming that the collected droplets are comprised of water). According to a third flow parameter, where the flowpath is generally cylindrical the gas stream may be passed through the flowpath substantially under annular flow conditions.

According to a fourth flow parameter, the superficial gas velocity of the gas stream through the flowpath or flowpaths may be maintained at no greater than a maximum value which is dependent upon the composition, temperature and pressure of the gas stream. For example, for a water-air system at a standard temperature of about 15 degrees Celsius and a standard pressure of 1 atmosphere, the superficial gas velocity of the gas stream through the flowpath may be maintained at no greater than about 10 meters per second, or more preferably at no greater than about 8 meters per second, or even more preferably at between about 6 meters per second and about 8 meters per second.

Alternatively, the superficial gas velocity of the gas stream may be slightly greater than is suggested by the above parameters, in which case the average size of any droplets which become re-atomized or re-entrained in the gas stream will tend to be significantly larger than the average size of the original liquid droplets, and will tend to be separable from the gas stream using gravitational or inertial separation technologies.

In the method of the invention, the collector surface draining step may be comprised of any procedure or combination of procedures which is effective to drain the collected droplets from the collector surface or surfaces.

In preferred embodiments, the collector surface draining step is performed using a drainage mechanism of the type described for the apparatus of the invention. The draining step may be comprised of draining the droplets from the collector surface and draining an amount of the gas stream from the flowpath. In the draining step, all of the collected droplets may be drained or only a portion of the collected droplets may be drained.

Where the draining step is comprised of draining an amount of the gas stream from the flowpath with the collected droplets, the gas stream is preferably drained so that the superficial gas velocity of the gas stream while being drained is maintained at no greater than a maximum value which is dependent upon the composition, temperature and pressure of the gas stream, in order to minimize re-atomization and re-entrainment of the collected droplets as they are being drained, or alternatively in order to maximize the size of any re-atomized or re-entrained droplets.

For example, for a water-air system at a standard temperature of about 15 degrees Celsius and a standard pressure of 1 atmosphere, the superficial gas velocity of the gas stream while being drained may be maintained at no greater than about 10 meters per second, or more preferably at no greater than about 8 meters per second, or even more preferably at between about 6 meters per second and about 8 meters per second. Preferably the superficial gas velocity of the gas stream while being drained is slightly less than the superficial gas velocity of the gas stream through the flowpath.

In the method of the invention, the invention may be further comprised of the step of receiving in a collection vessel the collected droplets which are drained from the collector surface or surfaces. The collection vessel receiving step may be comprised of any procedure or combination of procedures which is effective to receive the drained droplets. In preferred embodiments, the collection vessel receiving step is performed using a collection vessel of the type described for the apparatus of the invention. The collection vessel receiving step may be comprised of the step of receiving in a collection vessel the drained collected droplets from the collector surface or surfaces and the drained gas stream from the flowpath or flowpaths.

In the method of the invention, the invention may be further comprised of the step of separating the drained collected droplets and the drained gas stream to produce a plurality of products. The separating step may be performed in any manner, including by using gravitational and inertial separation technologies.

In the method of the invention, the invention may be further comprised of the step of cooling the gas stream. The gas stream cooling step may be comprised of any procedure or combination of procedures which is effective to cool the gas stream. In preferred embodiments, the gas stream cooling step is performed using a cooler of the type described for the apparatus of the invention.

In the method of the invention, the invention may be further comprised of the step of coalescing the collected droplets on the collector surfaces before draining the collected droplets as coalesced collected droplets. The coalescing step may result in the formation of small pools, liquid films or rivulets of coalesced collected droplets.

The invention is intended for use in both "clean" and impurities-laden environments. A liquid film comprising collected liquid droplets may include a large portion of solid particles which may be transferred to the collection vessel, thus minimizing plugging and/or contamination of the collector surface and the associated drainage mechanism.

The system of the invention may be used for extraction of solid particles which are combined with liquid droplets (such as when a mist of liquid is introduced on purpose to absorb or adsorb such solid particles) or may be used for separation of liquid droplets of the nature obtained during a bulk condensation process.

To take full advantage of a broad spectrum of applications including chemical reactions, extraction of dust, extraction of any small solid particles, or removal of liquid micro-droplets, the present invention is directed at a family of solutions and designs based on "collector surface turbulent impact and extraction of droplets and particles" from a gas stream.

In certain applications, the invention may be further comprised of an automated swing control system for eliminating the collected liquid droplets from the collector surface at desired levels or time intervals, and/or an automated swing system for executing "on line"washing operations of one apparatus while a pair apparatus is in operation.

Preferably the apparatus of the invention is designed to minimize the pressure drop experienced by the gas stream as it passes through the apparatus and preferably the method of the invention is performed so as to minimize the pressure drop experienced by the gas stream during performance of the method.

BRIEF DESCRIPTION OF THE DRAWINGS

Embodiments of the invention will now be described with reference to the accompanying drawings, in which.

DETAILED DESCRIPTION OF THE INVENTION

Figure 1A:
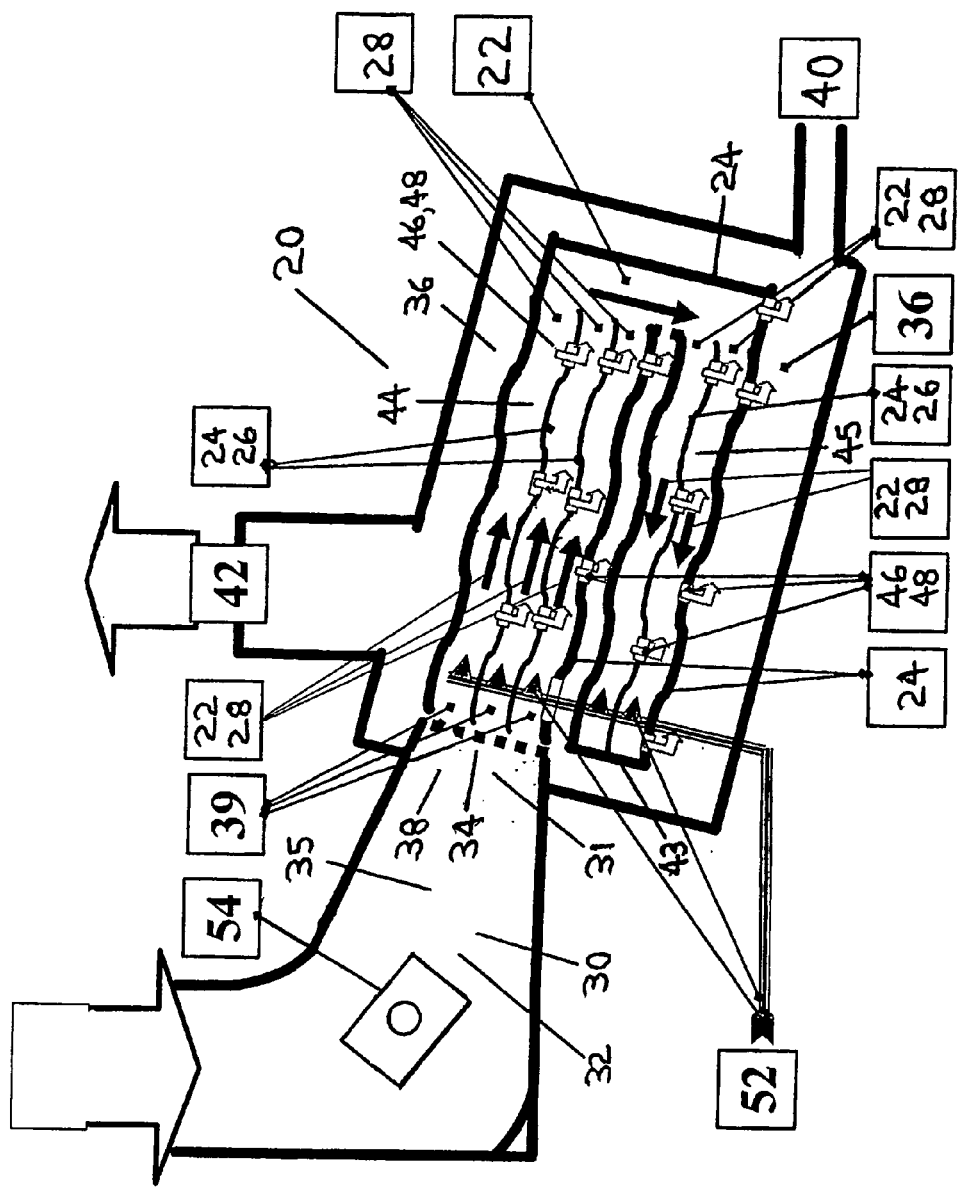
FIG. 1A is an elevation longitudinal section drawing of an apparatus according to a first preferred embodiment of the invention, utilizing a plurality of planar surfaces as a collector surface.
Figure 1B:
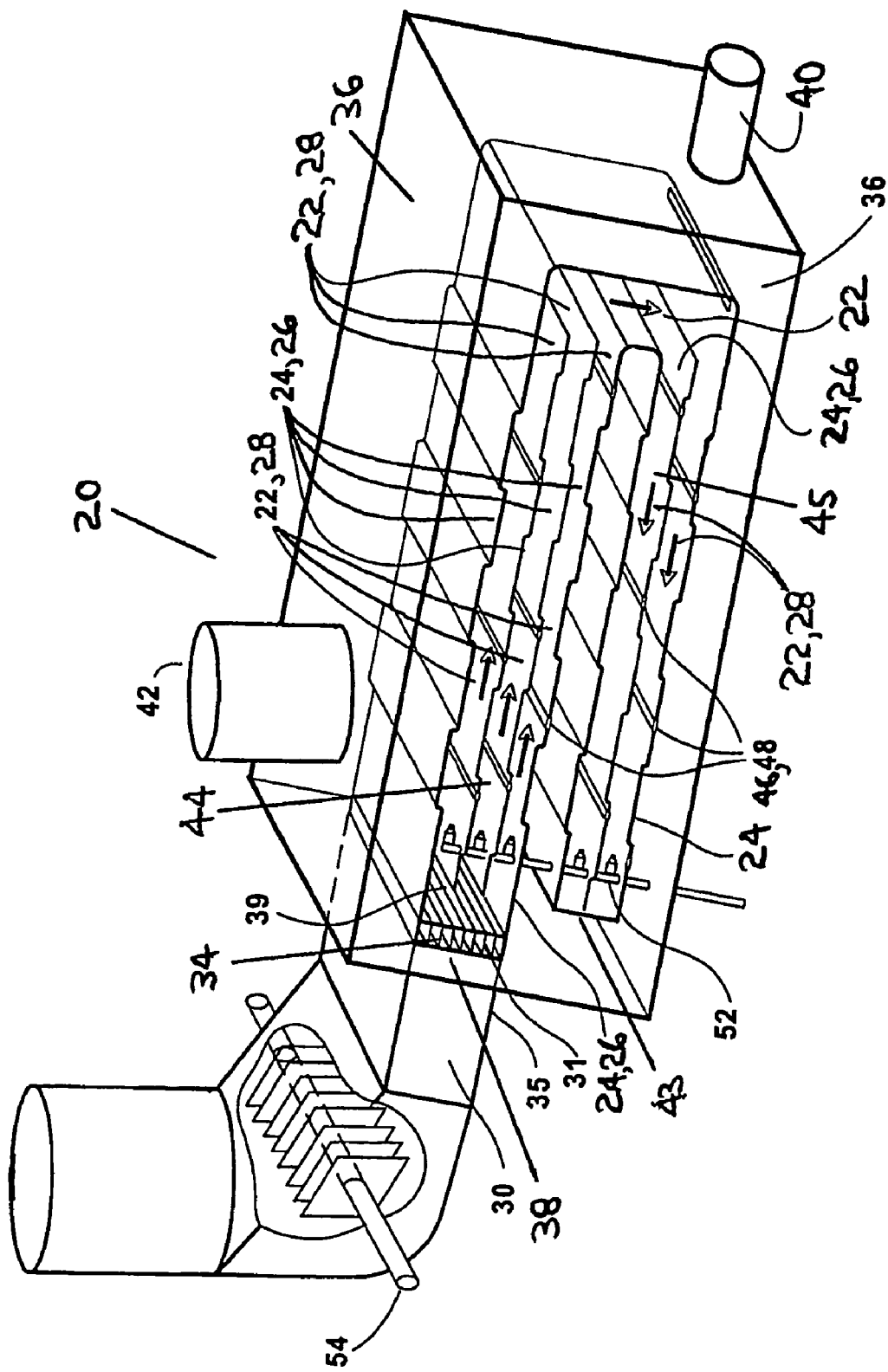
FIG. 1B is a partial cutaway pictorial drawing of the apparatus depicted in FIG. 1A.

A process involving passage of a gas stream containing droplets may include one or more steps such that a population of liquid droplets (in the range of, but not limited to between about 1 μm and about 100 μm) has been generated in a previous chemical or thermal process or simply as a result of condensing, and must be extracted from the carrying gas stream at high efficiency.

The present invention may be used as a stand-alone apparatus or method or, due to its high efficiency and relatively low pressure drop attributes may be a component of a process involving one or a combination of:

(a) a preliminary generation of liquid droplets; and
(b) a particle liquid/solid contact process or/and a combination of direct-contact extraction processes where liquid droplets are involved and must be effectively separated from the carrying gas stream.

When the invention is used in connection with any prior extraction technology requiring a liquid particle final separation the invention may therefore be a component of a complete separation process involving: (a) pulverization of the liquid into the liquid droplets (existing technology), (b) a direct-contact reaction/extraction using liquid droplets as an essential contact media, and (c) the use of the invention for the separation and/or recovery of the liquid droplets from the carrying gas stream.

An apparatus or method utilizing the invention includes the following elements:

(a) Collector Surface

The collector surface is preferably designed for maximum gas stream-surface contact, for drainage and removal of collected droplets and/or coalesced collected droplets and for minimizing the collected particle re-atomization and re-entrainment as a result of high-gas velocity breaking the film-gas interface. Preferably the collector surface functions to enhance collection of the droplets on the collector surface, to minimize re-atomization and re-entrainment of the collected droplets once they have been collected on the collector surface, to promote the coalescence of collected droplets into small pools, liquid films and/or rivulets, and to facilitate the draining of the coalesced collected droplets such that the droplet size of the coalesced collected droplets is significantly larger than the liquid droplets initially carried by the gas stream.

The collector surface may be designed as a metallic or non-metallic solid or flexible wall or pipe assembly or a liquid surface used as a collecting and coalescer medium for collecting droplets using the interfacial tension adhesive property of liquids to be attracted to a surface. Depending on the liquid nature (wetting or non-wetting), the collector surface may be conditioned to assure spreading of the "oil-wet" or "water-wet" collected droplets and the formation of small pools, liquid films or rivulets through coalescence of collected droplets.

(b) Drainage Mechanism

The purpose of the drainage mechanism is to drain or remove the collected droplets from the collector surface.

A liquid film comprising coalesced collected droplets may be directly eliminated or drained to some other location, such as for disposal, or may be received in a collection vessel, where the collected droplets may undergo further separation using mechanical separation techniques or other separation techniques. The collection vessel may also be used to contain the collected droplets in the event that the droplets are toxic or should otherwise be isolated from the surrounding atmosphere.

The method and apparatus must create flow conditions of the gas stream leading to a transitional or turbulent flow regime in the vicinity of the collector surface, since turbulence is the main mechanism used to project droplets entrained in the gas stream toward the collector surface. The method and apparatus should preferably also minimize re-atomization and re-entrainment of collected droplets back into the gas stream through breaking of pools, films or rivulets of collected droplets.

As a result, the flow of the gas stream through the flowpath should be managed to provide a flow which is substantially turbulent but moderate in order to avoid re-atomization and re-entrainment of collected droplets. Such moderation can be achieved by controlling one or more flow parameters relating to the flow of the gas stream through the flowpath. Such flow parameters may relate to a maximum Weber number within the flowpath, to the maintenance of annular flow conditions within the flowpath, to the superficial gas velocity of the gas stream through the flowpath, or to some other parameter.

The actual design of an apparatus or method utilizing the invention should take into account some other factors; which may, for example, be dependent upon the material, configuration and other characteristics of the collector surface. The following are additional objectives which may be considered in the design of an apparatus or method utilizing the invention:

1. progressively reducing the flow area of the gas stream axially along the flowpath in order to maintain the desired turbulent flow regime.
2. providing the capability to divide the gas stream into various flow elements or "sub-streams" for delivery to a plurality of flowpaths, aiming at a proper balance between flowrate, throughput, and maximum utilization of "collector surface collection area".

Having regard to the above general considerations, the preferred embodiments of the invention are directed at the following:

(a) the separation of liquid droplets (pure liquid or containing gas or solids) carried by a gas stream, in conjunction with a process involving gas cleaning, removal of solid particles, gas washing or direct gas-liquid/gas-liquid-solid contact reactions where the droplets are of relatively small dimensions;

(b) the separation of impure or pure droplets using the effect of intrinsic flow turbulence (micro-turbulence) and a system design to allow for creating a high probability of impacting the droplets with large "collector surface" areas where collection of the droplets on the collector surface is achieved due to interfacial tension adhesion;

(c) using vertical or inclined collector surfaces in order to create a favourable environment for coalescing and draining of a large number of collected droplets facilitated by forming small pools, liquid films or rivulets of coalesced collected droplets on the collector surface;

(d) draining the collected droplets and all or a portion of the gas stream through a drainage mechanism comprising a system of slits and collectors and allowing the collected droplets and the drained gas stream to move from a "high-turbulence gas droplets area" within the flowpath to an external collection area (collection vessel) which may provide for further separation amongst gas, liquid and solid phases;

(e) designing the collector surface and the flow characteristics of the gas stream to avoid excessive turbulence within the flowpath, in order to minimize the re-atomization or re-entrainment of droplets into the gas stream or in order to maximize the size of droplets which do become re-atomized or re-entrained in the gas stream; and (f) designing the drainage mechanism to avoid excessive turbulence within the drainage mechanism, in order to minimize the re-atomization and re-entrainment of droplets into the gas stream or in order to maximize the size of droplets which do become re-atomized or re-entrained in the gas stream.

Referring to FIG. 1, there is depicted an apparatus according to a first preferred embodiment of the invention which is intended for use in processing relatively large quantities of gas at relatively low pressure and carrying liquid droplets with or without solid particles attached, and with or without suspensions of viscous (“gum”) materials as additional impurities.

The apparatus of FIG. 1 is a planar collector surface apparatus (20) in which a flowpath (22) is defined by a collector surface (24) comprising a plurality of substantially planar surfaces. The collector surface (24) is preferably constructed of metal plates or sheets and is preferably textured to promote turbulent flow within the flowpath (22). The texturing may be comprised of corrugations, waves, ribs or a roughening of the collector surface (24). As depicted in FIG. 1, the collector surface (24) includes texturing comprising corrugations or waves. The collector surface (24) is preferably treated to resist corrosion and erosion and is also treated to be “wettable” by the liquid droplets which are intended to be removed from the gas stream.

As depicted in FIG. 1, the collector surface (24) is further comprised of additional surfaces (26) contained within the flowpath (22). The additional surfaces (26) each comprise substantially planar surfaces and function as additional collector surfaces for collecting liquid droplets. The additional surfaces (26) divide the flowpath (22) into a plurality of sub-flowpaths (28). The planar collector surface apparatus (20) may alternatively include a plurality of flowpaths instead of a single flowpath (22) having a plurality of sub-flowpaths (28).

The planar collector surface apparatus (20) is further comprised of a flow conditioner (30) for conditioning the gas stream and a distributor (31) for distributing the gas stream amongst the sub-flowpaths (28). As depicted in FIG. 1, the flow conditioner (30) and the distributor (31) are provided by a combined conditioner/distributor (35). Alternatively, the distributor (31) may be separate from the flow conditioner (30).

The combined conditioner/distributor (35) is connected with a source (not shown) for the gas stream, which source delivers the gas stream to the combined conditioner/distributor (35) as a flowing gas stream. Alternatively, the flow conditioner (30) or the combined conditioner/distributor (35) may be further comprised of a device, such as a pump (not shown) or a fan (not shown), for imparting flow to the gas stream.

As depicted in FIG. 1, the combined conditioner/distributor (35) is comprised of an admission chamber (32), which has a conical shape for progressively increasing the velocity of the gas stream to a level which will provide substantially turbulent flow of the gas stream. The combined conditioner/distributor (35) is further comprised of a grid (34) for imparting pseudo-homogeneous turbulent flow conditions to the gas stream after it has exited the admission chamber (32) by eliminating or minimizing large turbulent vortexes which may have resulted from ducts or elbows upstream of the admission chamber (32).

The flowpath (22), including the sub-flowpaths (28), and the collector surface (24) are completely contained within a closed collection vessel (36). The collection vessel (36) defines a gas inlet (38), a liquid drainage outlet (40), and a gas outlet (42). The combined conditioner/distributor (35) is positioned adjacent to the gas inlet (38).

The flowpath (22) is contained entirely within the collection vessel (36). The flowpath (22) is comprised of a flowpath inlet (39) and a flowpath end (43). The flowpath inlet (39) is connected to the combined conditioner/distributor (35) so that the gas stream from the source is divided into separate gas streams for each of the sub-flowpaths (28). The flowpath (22) terminates at the flowpath end (43).

The flowpath (22) includes a first section (44) and a second section (45). As depicted in FIG. 1, the first section (44) of the flowpath (22) is comprised of three sub-flowpaths (28), while the second section (45) of the flowpath (22) is comprised of two sub-flowpaths (28).

The planar collection surface apparatus (20) is further comprised of a drainage mechanism (46) for draining coalesced collected droplets which are collected on the collector surface (24), and for draining the gas stream from the flowpath (22). The drainage mechanism (46) is comprised of a plurality of slits (48) which are defined by the collector surface (24). The sections (44,45) of the flowpath (22) are declined and inclined respectively to encourage movement of the coalesced liquid droplets toward the slits (48) and to encourage further coalescence of collected droplets.

The slits (48) are spaced axially between the flowpath inlet (39) and the flowpath end (43). The sections (44,45) of the flowpath (22) are sized, and the slits (48) are spaced and sized so that an amount of the gas stream passes through the slits (48) with the collected liquid droplets at substantially the same velocity through each of the slits (48). In addition, the velocity of the gas stream through each of the slits (48) is preferably controlled to minimize re-atomization or re-entrainment of liquid droplets or to maximize the size of any droplets which do re-atomize or re-entrain in the gas stream.

The drainage mechanism (46) may be further comprised of troughs or grooves (not shown) in the collector surface (24) for directing collected liquid droplets toward the slits (48).

The planar collector surface apparatus (20) is further comprised of a washer (52) for washing the apparatus (20) to remove residue and other impurities therefrom. The washer (52) is preferably comprised of a spraying system by which water or some other solvent can be sprayed onto the collector surface (24).

The planar collector surface apparatus (20) is also further comprised of a cooler (54) positioned within the combined conditioner/distributor (35) for cooling the gas stream before the gas stream enters the flowpath (22).

In operation, a gas stream from the source is passed through the cooler (54) in order to condense water vapor contained in the gas stream and/or increase the size of liquid droplets contained in the gas stream. From the cooler (54), the gas stream is passed through the combined conditioner/distributor (35) where the gas stream is conditioned, divided and distributed substantially evenly to the sub-flowpaths (28) under substantially turbulent conditions such that the probability of liquid droplets contacting the collector surface (24) can be enhanced while the re-entrainment of the liquid droplets into the gas stream can be minimized.

The liquid droplets contained in the gas stream pass through the sub-flowpaths (28) generally axially, contact or nearly contact the collector surface (24) due to the turbulent flow conditions and become collected on the collector surface (24) due to adhesion forces between the liquid droplets and the collector surface (24). The collected liquid droplets coalesce together and form a liquid film of coalesced collected droplets on the collector surface (24) which film is drained in a controlled manner from the collector surface (24) through the slits (48) in the collector surface (24), along with the gas stream.

The drained collected droplets and the drained gas stream are received in the collection vessel (36), where they may undergo further secondary separation to separate liquid from the gas phase of the gas stream or to separate solid particles from either the liquid or the gas phase. From the collection vessel (36), the various separated products may optionally be directed to additional separation apparatus (not shown) to provide for multi-stage separation.

The product gas stream exits the collection vessel through the gas outlet (42). The product gas stream may then be stored, disposed of, or delivered for use in an apparatus such as a compressor, turbine, or burner, depending upon the composition of the gas stream and the particular application of the invention.

The operation of the planar collector surface apparatus (20) may be interrupted intermittently so that that the apparatus (20) can be cleaned and restored using the washer (52).

Figure 2B:
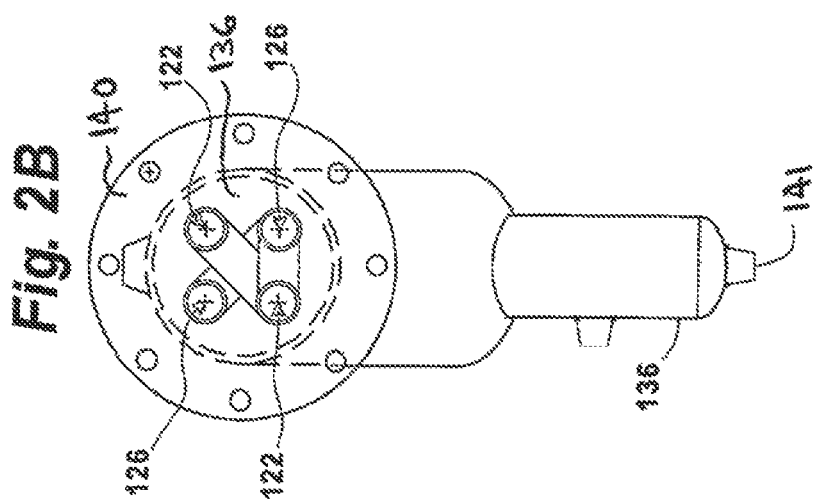
FIG. 2B is a transverse section drawing of the apparatus depicted in FIG. 2A, taken along line B-B.
Figure 2A:
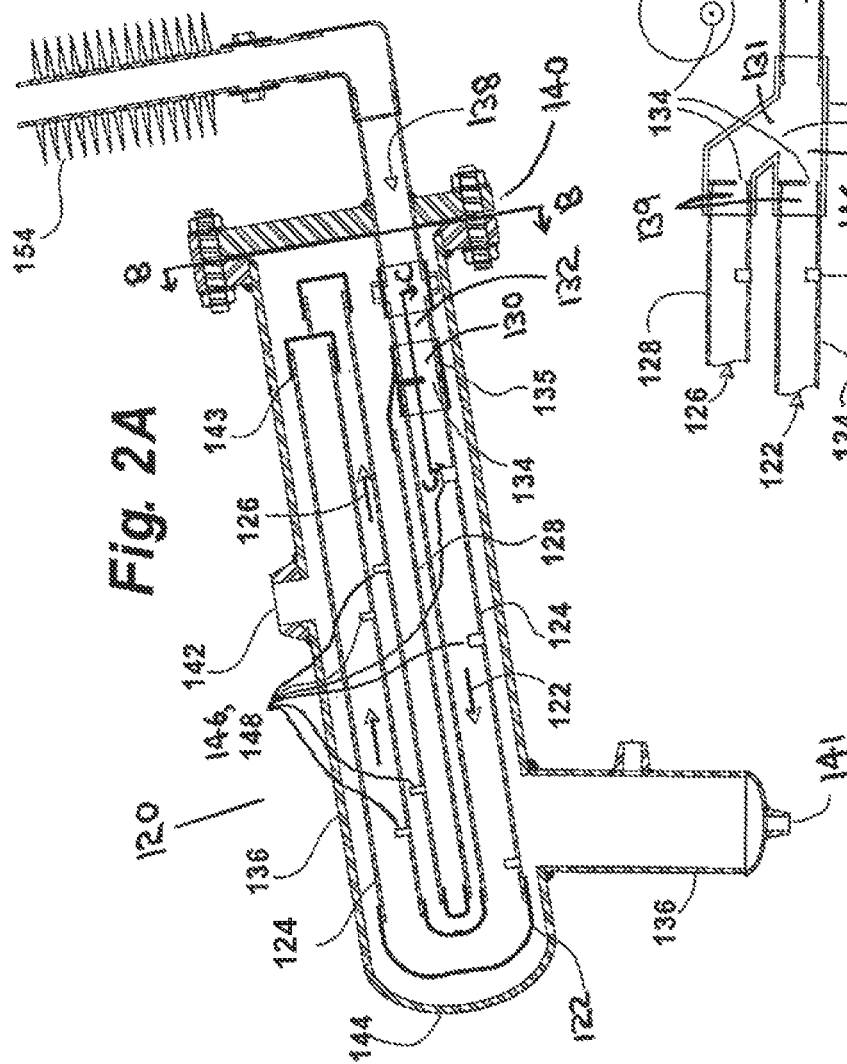
FIG. 2A is an elevation longitudinal section drawing of an apparatus according to a second preferred embodiment of the invention, utilizing a cylindrical surface or conduit as a collector surface.
Figure 2C:
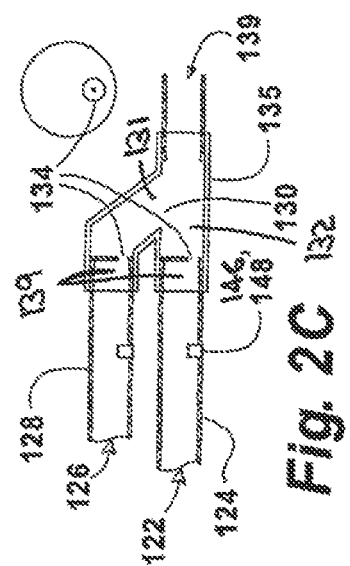
FIG. 2C is a plan longitudinal section drawing of a combined conditioner/distributor from the apparatus depicted in FIG. 2A, taken along line C-C.

Referring to FIG. 2, there is depicted an apparatus according to a second preferred embodiment of the invention, which may be suitable for processing relatively small quantities of gas, but potentially at a relatively high pressure, with or without solid particles attached, and with or without suspensions of viscous ("gum") materials as additional impurities.

The apparatus of FIG. 2 is a cylindrical collector surface apparatus (120) in which a first flowpath (122) is defined by a first collector surface (124) comprising a conduit or pipe. The first collector surface (124) is preferably constructed of cylindrical metal tubing and is preferably textured to promote turbulent flow within the first flowpath (122). The first collector surface (124) is preferably treated to resist corrosion and erosion and is also treated to be "wettable" by the liquid droplets which are intended to be removed from the gas stream.

As depicted in FIG. 2, the cylindrical collector surface apparatus (120) is further comprised of a second flowpath (126) which is defined by a second collector surface (128) comprising a conduit or pipe. The second collector surface (128) is preferably similar to the first collector surface (124) with respect to materials and construction. Although the second flowpath (126) is depicted in FIG. 2 as being the same size as the first flowpath (122), the second flowpath (126) could be smaller or larger than the first flowpath (122). The cylindrical collector surface apparatus (120) may alternatively include a single flowpath or more than two flowpaths.

Referring to FIGS. 2-3, the cylindrical collector surface apparatus (120) is further comprised of a flow conditioner (130) for conditioning the gas stream and a distributor (131) for distributing the gas stream to the flowpaths (122,126). As depicted in FIG. 2, the flow conditioner (130) and the distributor (131) are provided by a combined conditioner/distributor (135). Alternatively, the distributor (131) may be separate from the flow conditioner (130).

The combined conditioner/distributor (135) is connected with a source (not shown) for the gas stream, which source delivers the gas stream to the combined conditioner/distributor (135) as a flowing gas stream. Alternatively, the flow conditioner (130) or the combined conditioner/distributor (135) may be further comprised of a device, such as a pump (not shown) or a fan (not shown), for imparting flow to the gas stream.

As depicted in FIGS. 2-3, the combined conditioner/distributor (135) is comprised of a distributor manifold (132) which includes a turbulence promoting orifice (134) for each of the flowpaths (122,126). The distributor manifold (132) distributes the gas stream to the flowpaths (122,126) and the turbulence promoting orifices (134) condition the gas stream to provide substantially turbulent flow of the gas stream through each of the flowpaths (122,126).

The flowpaths (122,126) and the collector surfaces (124,128) are completely contained within a closed collection vessel (136). The collection vessel (136) defines a gas inlet (138) adjacent to a first end (140) of the collection vessel (136), a liquid drainage outlet (141), and a gas outlet (142) between the first end (140) and a second end (144) of the collection vessel (136). The combined conditioner/distributor (135) is positioned within the collection vessel (136) adjacent to the gas inlet (138).

Each of the flowpaths (122,126) is comprised of a flowpath inlet (139) and a flowpath end (143). The flowpaths (122,126) terminate at the flowpath ends (143). The flowpath inlets (139) for each of the flowpaths (122,126) are connected to the combined conditioner/distributor (135) so that the gas stream from the source is divided into separate gas streams for each of the flowpaths (122,126).

The cylindrical collection surface apparatus (120) is further comprised of a drainage mechanism (146) for draining coalesced collected droplets which are collected on the collector surfaces (124,128), and for draining the gas stream from the flowpaths (122,126). The drainage mechanism (146) is comprised of a plurality of slits (148) which are defined by the collector surfaces (124,128). The flowpaths (122,126) are partly declined and partly inclined to encourage movement of the coalesced collected droplets toward the slits (148) and to encourage further coalescence of collected droplets.

The slits (148) are oriented transversely in the collector surfaces (124,128), are spaced axially between the flowpath inlets (139) and the flowpath ends (143). The slits (148) are spaced and sized so that an amount of the gas stream passes through the slits (148) with the collected liquid droplets at substantially the same velocity through each of the slits (148). In addition, the velocity of the gas stream through each of the slits (148) is preferably controlled to minimize re-atomization or re-entrainment of liquid droplets or to maximize the size of any droplets which do re-atomize or re-entrain in the gas stream.

The drainage mechanism (146) may be further comprised of troughs or grooves (not shown) in the collector surfaces (124,128) for directing collected liquid droplets toward the slits (148).

The cylindrical collector surface apparatus (120) is further comprised of a cooler (154) positioned upstream of the combined conditioner/distributor (135) for cooling the gas stream before the gas stream enters the flowpaths (122,126).

In operation, a gas stream from the source is passed through the cooler (154) in order to condense water vapor contained in the gas stream and/or increase the size of liquid droplets contained in the gas stream. From the cooler (154), the gas stream is passed through the combined conditioner/distributor (135) where the gas stream is conditioned, divided and distributed substantially evenly to the flowpaths (122, 126) under substantially turbulent conditions such that the probability of liquid droplets contacting the collector surfaces (124,128) can be enhanced while the re-entrainment of the liquid droplets into the gas stream can be minimized.

The liquid droplets contained in the gas stream pass through the flowpaths (122,126) generally axially, contact the collector surfaces (124,128) due to the turbulent flow conditions and become collected on the collector surfaces (124, 128) due to adhesion forces between the liquid droplets and the collector surfaces (124,128). The collected liquid droplets coalesce together and form a liquid film of coalesced collected droplets on the collector surfaces (124,128) which is drained in a controlled manner from the collector surfaces (124,128) through the slits (148), along with the gas stream.

The drained collected droplets and the drained gas stream are received in the collection vessel (136), where they may undergo further secondary separation to separate liquid from the gas phase of the gas stream or to separate solid particles from either the liquid or the gas phase. From the collection vessel (136), the various separated products may optionally be directed to additional separation apparatus (not shown) to provide for multi-stage separation.

The product gas stream exits the collection vessel through the gas outlet (142). The product gas stream may then be stored, disposed of, or delivered for use in an apparatus such as a compressor, turbine, or burner, depending upon the composition of the gas stream and the particular application of the invention.

The embodiments of the invention in which an exclusive property or privilege is claimed are defined as follows:

1. An apparatus for removing liquid droplets from a gas stream, the apparatus comprising at least one flowpath assembly, wherein each flowpath assembly is comprised of:
   (a) a flowpath for the gas stream, the flowpath comprising a flowpath inlet;
   (b) a collector surface, positioned adjacent to the flowpath so that the gas stream is in communication with the collector surface as the gas stream passes through the flowpath, for collecting the droplets as collected droplets;
   (c) a flow conditioner in communication with the flowpath inlet, for conditioning the gas stream to provide substantially turbulent and generally axial flow of the gas stream through the flowpath; and
   (d) a drainage mechanism associated with the collector surface, for draining the collected droplets from the collector surface as drained collected droplets.

2. The apparatus as claimed in claim 1 wherein the flowpath is defined by the collector surface.

3. The apparatus as claimed in claim 1 wherein the collector surface is comprised of a generally planar surface.

4. The apparatus as claimed in claim 2 wherein the collector surface is comprised of a plurality of generally planar surfaces.

5. The apparatus as claimed in claim 2 wherein the collector surface is comprised of a generally cylindrical surface.

6. The apparatus as claimed in claim 2 wherein the drainage mechanism is comprised of at least one aperture defined by the collector surface.

7. The apparatus as claimed in claim 2 wherein the drainage mechanism is comprised of a plurality of slits defined by the collector surface.

8. The apparatus as claimed in claim 7 wherein the flowpath is further comprised of a flowpath end and wherein the slits are spaced axially along the collector surface between the flowpath inlet and the flowpath end.

9. The apparatus as claimed in claim 2 wherein the flowpath is further comprised of a flowpath end and wherein the flowpath is oriented so that the flowpath end is positioned below the flowpath inlet.

10. The apparatus as claimed in claim 2, further comprising a collection vessel associated with the drainage mechanism, for receiving the drained collected droplets.

11. The apparatus as claimed in claim 2 wherein the flowpath is further comprised of a flowpath end and wherein the drainage mechanism further drains the gas stream from the flowpath as a drained gas stream, further comprising a collection vessel associated with the drainage mechanism, for receiving the drained collected droplets and the drained gas stream.

12. The apparatus as claimed in claim 11 wherein the collection vessel is adapted for gravitationally separating the drained collected droplets and the drained gas stream into a plurality of products.

13. The apparatus as claimed in claim 2 wherein the collector surface is comprised of a material wettable by the droplets.

14. The apparatus as claimed in claim 2 wherein the collector surface is a textured surface.

15. The apparatus as claimed in claim 5 wherein the flowpath has a diameter of between about 15 millimeters and about 50 millimeters.

16. The apparatus as claimed in claim 2, further comprising a cooler for cooling the gas stream before the gas stream enters the flowpath.

17. The apparatus as claimed in claim 1, the apparatus further comprising:
   (a) a plurality of parallel flowpath assemblies; and
   (b) a distributor associated with each of the flowpath inlets, for distributing the gas stream to each of the flowpaths.

18. The apparatus as claimed in claim 17 wherein each of the flowpaths is defined by the collector surfaces.

19. The apparatus as claimed in claim 18 wherein each of the collector surfaces is comprised of generally planar surfaces.

20. The apparatus as claimed in claim 18 wherein each of the collector surfaces is comprised of generally cylindrical surfaces.

21. The apparatus as claimed in claim 18 wherein each of the drainage mechanisms is comprised of a plurality of apertures defined by the collector surface.

22. The apparatus as claimed in claim 18 wherein each of the drainage mechanisms is comprised of a plurality of slits defined by the collector surface.

23. The apparatus as claimed in claim 22 wherein each of the flowpaths is further comprised of a flowpath end and wherein the slits are spaced axially along the collector surface between the flowpath inlet and the flowpath end.

24. The apparatus as claimed in claim 18 wherein each of the flowpaths is further comprised of a flowpath end and wherein each of the flowpaths is oriented so that the flowpath end is positioned below the flowpath inlet.

25. The apparatus as claimed in claim 18, further comprising a collection vessel associated with the drainage mechanisms, for receiving the drained collected droplets.

26. The apparatus as claimed in claim 18 wherein each of the flowpaths is further comprised of a flowpath end and wherein the drainage mechanisms further drain the gas stream from the flowpath as a drained gas stream, further comprising a collection vessel associated with the drainage mechanisms, for receiving the drained collected droplets and the drained gas stream.

27. The apparatus as claimed in claim 26 wherein the collection vessel is adapted for gravitationally separating the drained collected droplets and the drained gas stream into a plurality of products.

28. The apparatus as claimed in claim 18 wherein each of the collector surfaces is comprised of a material wettable by the droplets.

29. The apparatus as claimed in claim 18 wherein each of the collector surfaces is a textured surface.

30. The apparatus as claimed in claim 20 wherein each of the flowpaths has a diameter of between about 15 millimeters and about 50 millimeters.

31. The apparatus as claimed in claim 18, further comprising a cooler associated with each of the flowpath inlets, for cooling the gas stream before the gas stream enters the flowpaths.

* * * * *